US011371284B2

(12) United States Patent
Karolevitz

(10) Patent No.: US 11,371,284 B2
(45) Date of Patent: Jun. 28, 2022

(54) SCREEN ATTACHMENT ADAPTER

(71) Applicant: Kenneth J. Karolevitz, Yankton, SD (US)

(72) Inventor: Kenneth J. Karolevitz, Yankton, SD (US)

(*) Notice: Subject to any disclaimer, the term of this patent is extended or adjusted under 35 U.S.C. 154(b) by 0 days.

(21) Appl. No.: 17/064,744

(22) Filed: Oct. 7, 2020

(65) Prior Publication Data

US 2021/0102427 A1 Apr. 8, 2021

Related U.S. Application Data

(60) Provisional application No. 62/911,436, filed on Oct. 7, 2019.

(51) Int. Cl.
*E06B 9/52* (2006.01)
*B60J 1/20* (2006.01)

(52) U.S. Cl.
CPC .............. *E06B 9/52* (2013.01); *B60J 1/2094* (2013.01); *E06B 2009/527* (2013.01)

(58) Field of Classification Search
CPC .. E06B 3/2605; E06B 3/62; E06B 2003/6267; E06B 9/52; E06B 2009/527; B60J 1/2094; B60J 1/2011
USPC ............... 52/656.1, 656.7, 656.5, 204.1, 202
See application file for complete search history.

(56) References Cited

U.S. PATENT DOCUMENTS

| | | | | |
|---|---|---|---|---|
| 2,596,438 A * | 5/1952 | Rollings | ................ | E05D 15/00 160/369 |
| 2,780,327 A * | 2/1957 | Gunnar | ..................... | E06B 3/44 52/656.7 |
| 2,835,325 A * | 5/1958 | Gilbert | ...................... | E06B 9/52 160/369 |
| 2,847,724 A * | 8/1958 | Blood | .................... | E06B 3/2605 49/489.1 |
| 2,989,788 A * | 6/1961 | Kessler | ................. | E06B 3/9682 403/295 |
| 3,255,810 A * | 6/1966 | Rowbottam | ............. | E06B 9/52 160/354 |
| 3,442,059 A * | 5/1969 | Kessler | ..................... | E06B 3/62 52/204.595 |
| 4,114,331 A * | 9/1978 | Yamamoto | ............ | E06B 3/4654 160/90 |
| 4,368,594 A * | 1/1983 | Milam | ...................... | E05D 1/00 49/67 |
| RE32,509 E * | 9/1987 | Werner | ..................... | E06B 3/28 52/202 |

(Continued)

FOREIGN PATENT DOCUMENTS

| | | | | |
|---|---|---|---|---|
| EP | 2878757 A2 * | 6/2015 | ............ | E06B 9/522 |
| EP | 2021572 B1 | 8/2016 | | |

(Continued)

*Primary Examiner* — Brent W Herring
(74) *Attorney, Agent, or Firm* — Daniel J. Honz; Advent, LLP

(57) ABSTRACT

Systems and methods for receiving a screen and securing the screen relative to a frame are described. A device embodiment includes, but is not limited to, an adapter body defining a channel configured to receive a rigid screen support supporting a screen, and an extension offset from the channel, the extension configured to be inserted into a groove of a frame for an opening to hold the screen relative to the opening when the channel receives the rigid screen support.

17 Claims, 6 Drawing Sheets

(56) References Cited

U.S. PATENT DOCUMENTS

| | | | |
|---|---|---|---|
| 7,861,473 B1 * | 1/2011 | Green | E06B 9/521 |
| | | | 52/210 |
| 8,966,839 B2 * | 3/2015 | Rebman | E06B 3/263 |
| | | | 52/203 |
| 9,290,990 B2 | 3/2016 | Hicks et al. | |
| 9,512,666 B2 * | 12/2016 | Reyher | E06B 1/36 |
| 11,149,491 B1 * | 10/2021 | Ulsh | E06B 3/96 |
| 2007/0119553 A1 | 5/2007 | Guffey | |

FOREIGN PATENT DOCUMENTS

| | | | | |
|---|---|---|---|---|
| KR | 20140020519 A * | 2/2014 | | |
| KR | 101575664 B1 * | 12/2015 | | |
| KR | 101788778 B1 * | 10/2017 | | |
| KR | 102118111 B1 * | 6/2020 | | |
| WO | WO-2017136894 A1 * | 8/2017 | | E06B 9/04 |

* cited by examiner

SCREEN ATTACHMENT ADAPTER

CROSS-REFERENCE TO RELATED APPLICATIONS

The present application claims the benefit under 35 U.S.C. § 119(e) of U.S. Provisional Application Ser. No. 62/911,436, filed Oct. 7, 2019, and titled "SCREEN ATTACHMENT ADAPTER." U.S. Provisional Application Ser. No. 62/911,436 is herein incorporated by reference in its entirety.

BACKGROUND

Mesh screens are used to cover doors, windows, or other openings in buildings and vehicles to prevent the passage of debris, insects, or other objects while permitting the passage of air. The material, shape, size of openings, and other mesh factors contribute to the durability and function of a mesh screen. In use, a mesh screen can become damaged, such as by being ripped, punctured, deformed, or otherwise altered due to impact, expansion, contraction, weather conditions, or the like. Replacement or repair of such damaged screens with new screens or portions thereof can be an option to restore or improve the functionality of the mesh.

SUMMARY

Systems and methods for receiving a screen and securing the screen relative to a frame are described. A device embodiment includes, but is not limited to, adapter body defining a channel configured to receive a rigid screen support supporting a screen, and an extension offset from the channel, the extension configured to be inserted into a groove of a frame for an opening to hold the screen relative to the opening when the channel receives the rigid screen support.

A device embodiment includes, but is not limited to, an adapter body defining a first channel and a second channel, the first channel configured to receive at least a portion of a frame defining an opening for a screen, the second channel is offset from the first channel and is configured to receive a rigid screen support supporting the screen, the adapter body including a first body extension and a second body extension, the first channel defined between the first body extension and the second body extension, the second body extension configured to inserted into a groove of the frame; a first channel extension extending from the first body extension; and a second channel extension extending from the first body extension, wherein the second channel is defined between the first channel extension and the second channel extension.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. In the figures, the use of the same reference numbers in different instances in the description and the figures may indicate similar or identical items.

DETAILED DESCRIPTION

Overview

Figure 1:
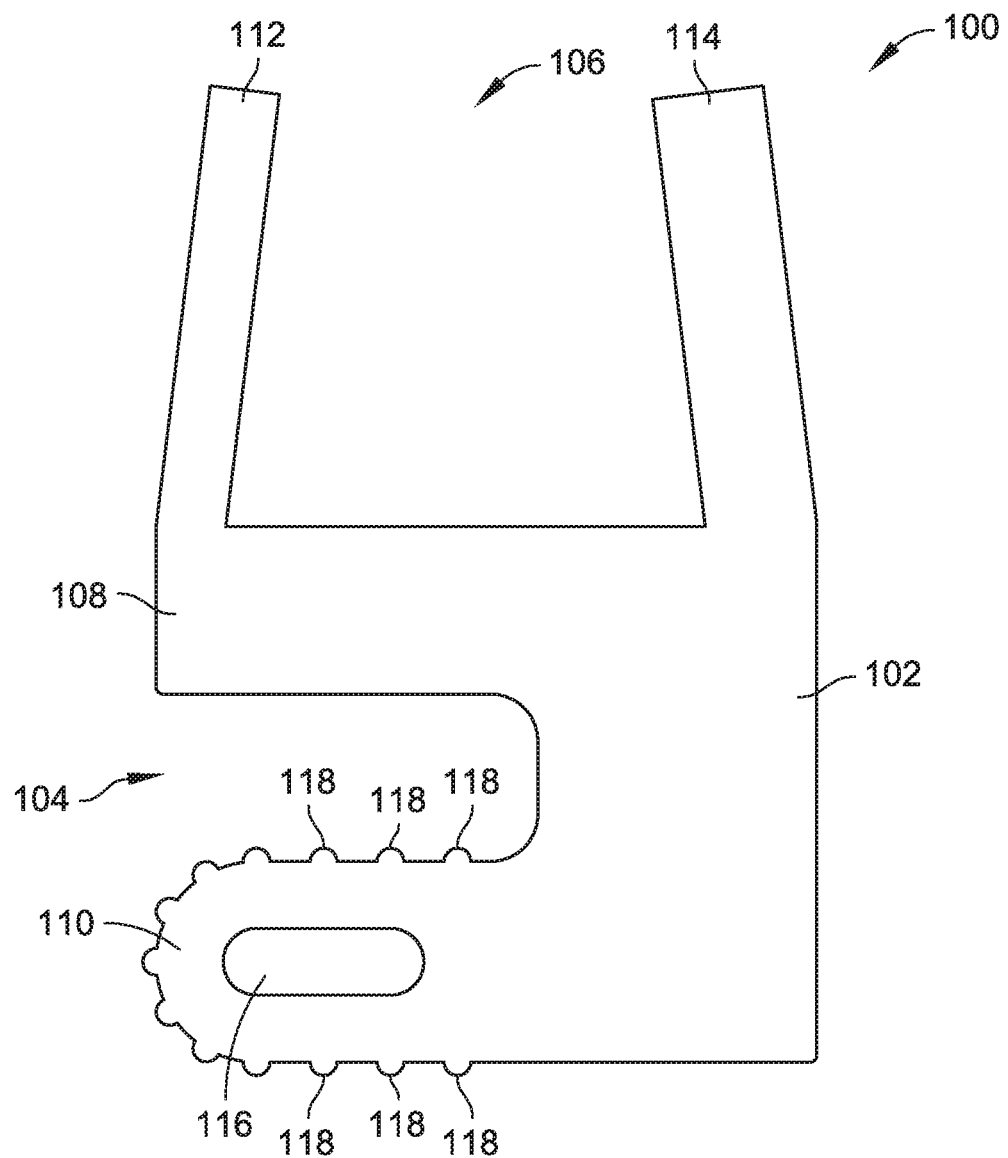
FIG. 1 is an end view of a screen attachment adapter in accordance with example implementations of the present disclosure.

Installation of a screen or replacement of an existing screen depends upon the type of opening to be covered or the type of screen or screen frame currently in place. For example, one type of mesh screen is installed adjacent an opening by holding the screen within a screen frame and inserting the screen frame into mounting groves near the opening. Such mesh screens can be held in place relative to a screen frame by a spline inserted into a groove or channel of the screen frame, where the spline presses the screen against the screen frame. Adhesive or friction fit secures the screen relative to the frame. However, installation of the splines and the screen can be cumbersome. For instance, the screen can move or warp during installation of the splines, excess spline material can interfere with the screen frame (e.g., prior to or during installation of the screen frame into the opening), and the like.

Another style of mesh screen includes a mesh material that is held under tension by a flexible screen frame having sufficient rigidity when no external forces are applied to the frame. The flexible screen frame is inserted into receiving grooves of a door or window frame through deformation of the screen frame upon application of a force on the screen frame. The screen frame then reverts to the original shape when the force is removed to secure the screen frame and mesh material in the door or window frame. However, such flexible mesh screens may not attach to existing screen frames already secured in door or window frames due to the incompatibility of the spline groove or channel of the screen frame and the flexible screen frame.

Accordingly, the present disclosure is directed, at least in part, to systems and methods for receiving a screen with an adapter that secures the screen to a screen frame to permit the screen frame and screen to be installed in a window frame, door frame, or other opening. The adapter includes a channel to receive a screen support (e.g., flexible screen frame, rigid screen support, etc.) and an extension portion to fit into a channel or groove of a screen frame into which a mesh screen and spline would traditionally fit. Following installation of the screen support on the adapter and the adapter onto the screen frame, the extension portion fixes the adapter relative to the screen frame and the adapter channel fixes the screen support relative to the screen frame.

The screen frame can be installed into a window frame, door frame, or other opening traditionally served by the screen frame prior to insertion of the adapter into a groove of a frame for the opening, subsequent to insertion of the adapter into the groove, or combinations thereof. The adapter can be positioned along the interior perimeter of a screen frame or portion thereof to secure the screen support and associated screen relative to the screen frame. For example, for a rectangular screen frame having two lengthwise sections and two width sections to fit in a door frame, an adapter can be positioned along both lengths of the screen frame interior and both widths of the screen frame interior. The adapter can be formed in various lengths to fit the perimeters of the screen frame to be installed in the desired window frame, door frame, or other opening.

Example Implementations

Figure 2:
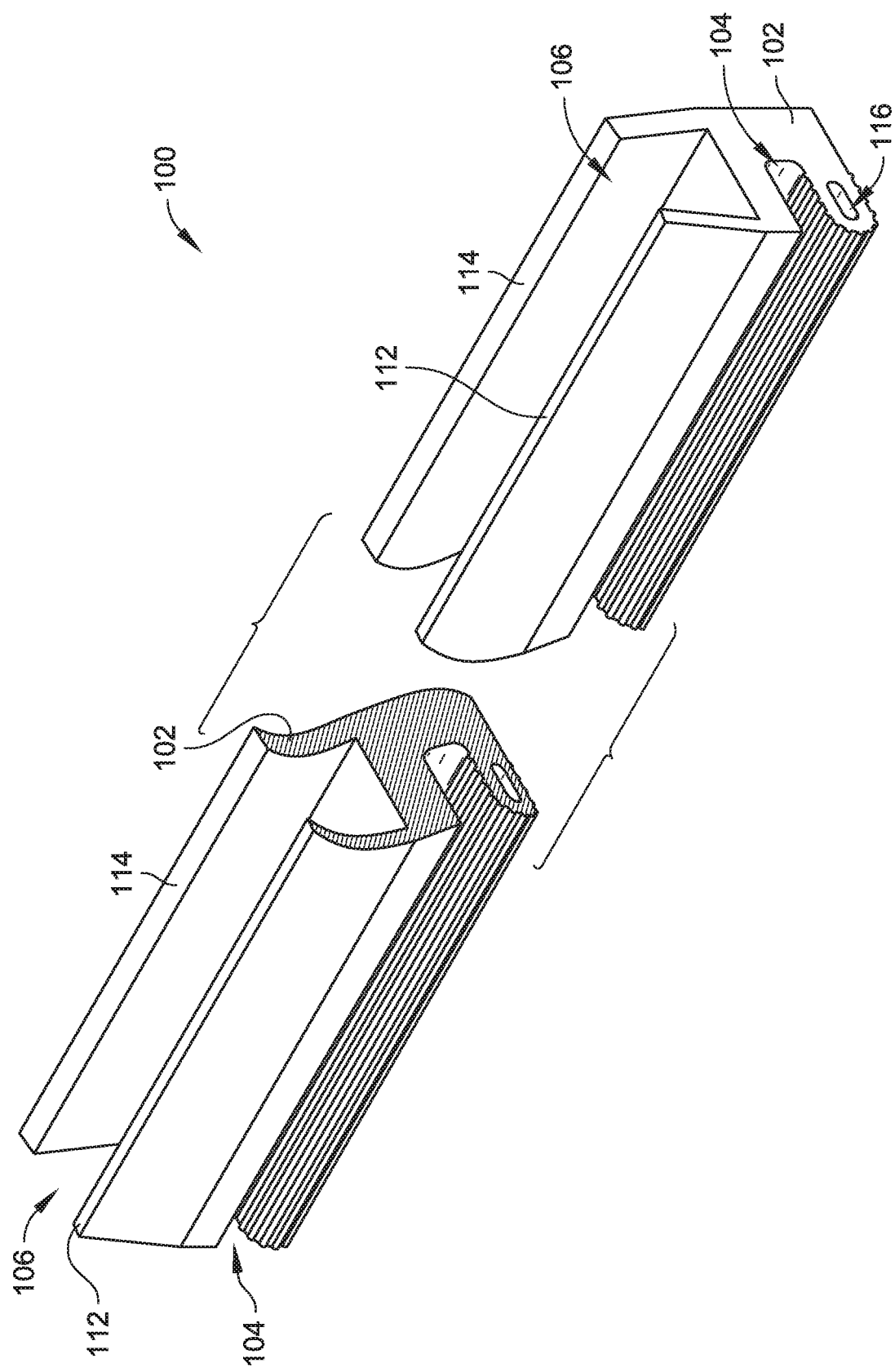
FIG. 2 is a partial isometric view of the screen attachment adapter of FIG. 1.
Figure 3:
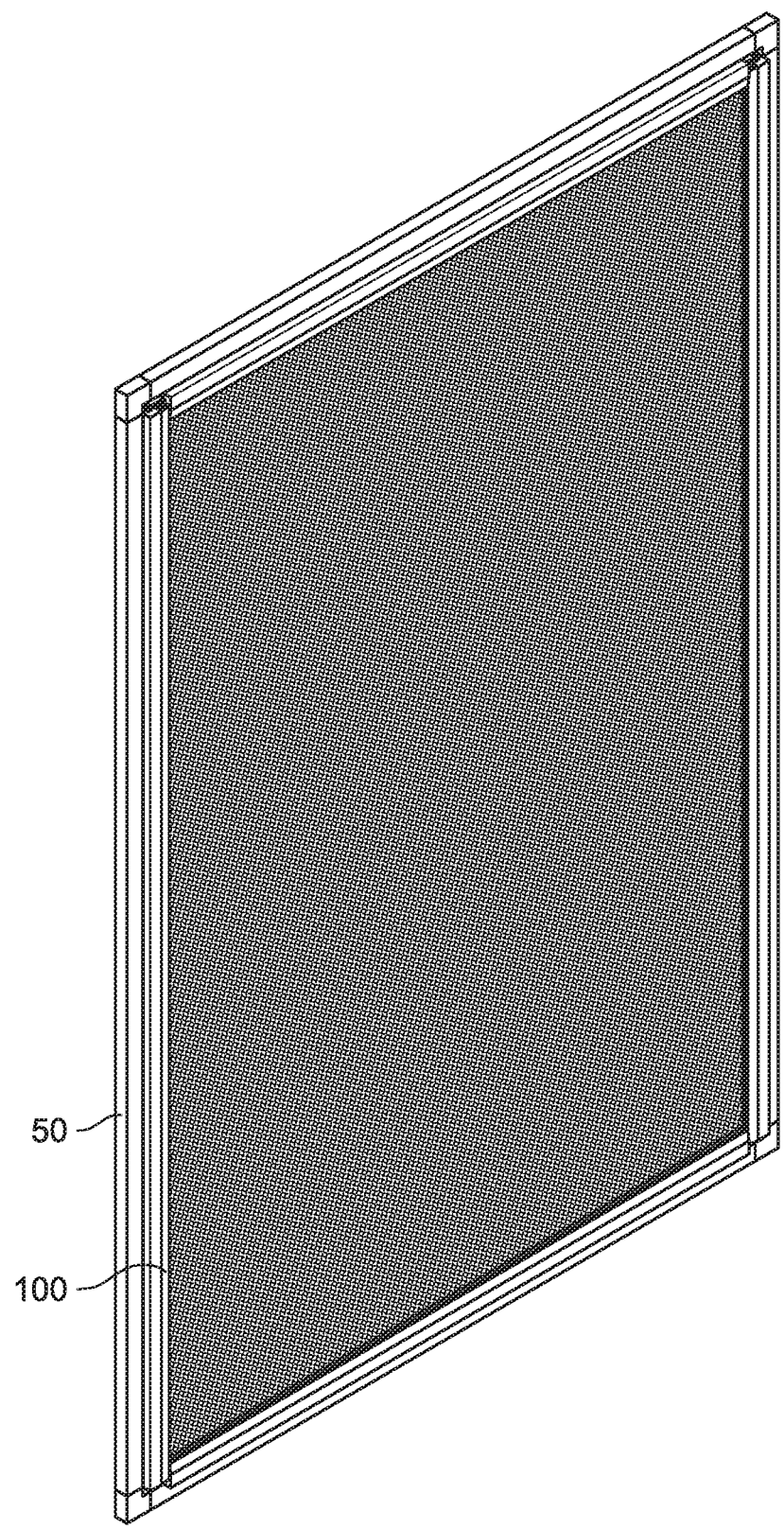
FIG. 3 is an isometric view of the screen attachment adapter of FIG. 1 securing a screen relative to a frame in accordance with example implementations of the present disclosure.
Figure 4:
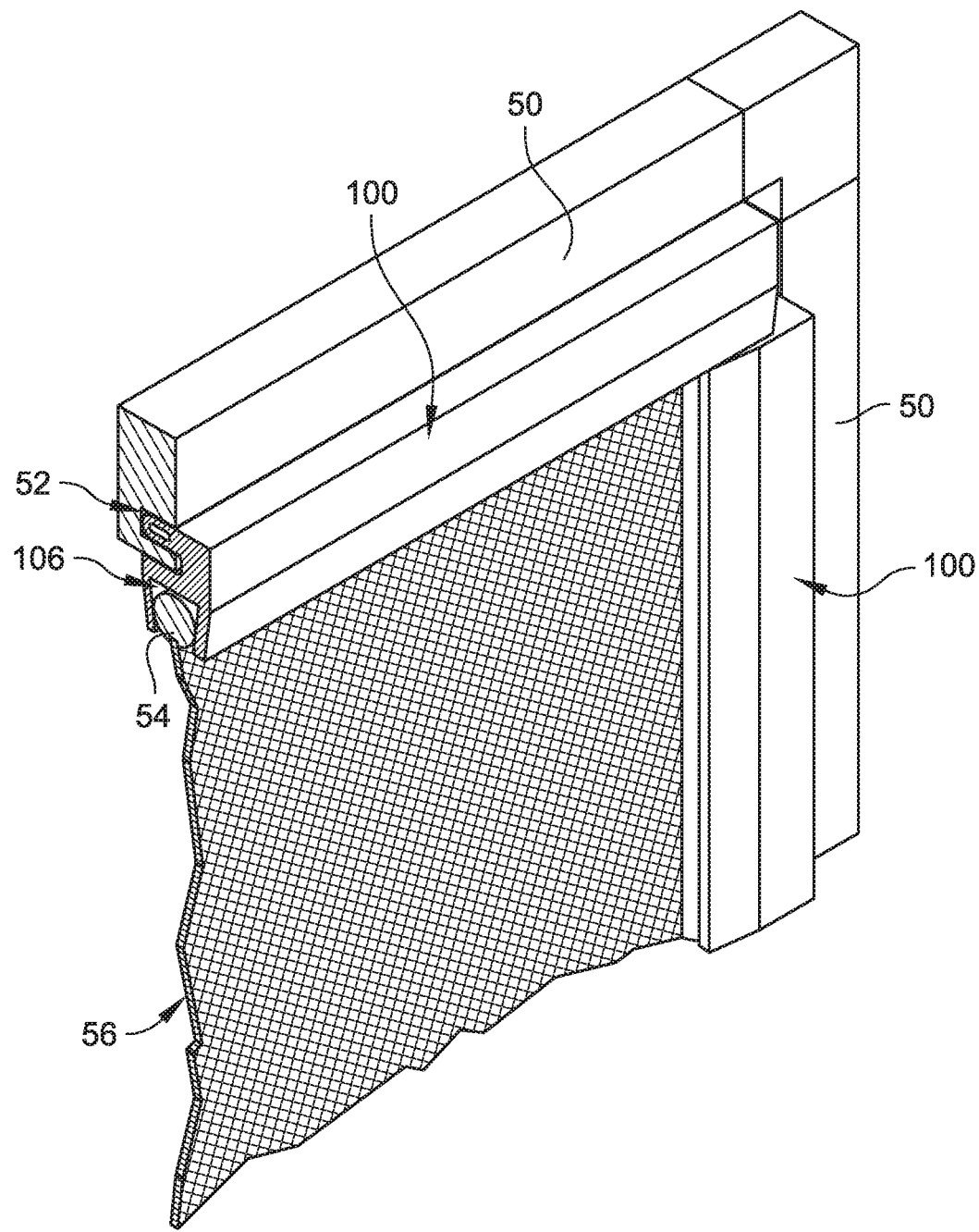
FIG. 4 is a partial isometric view of the screen attachment adapter of FIG. 1 securing a screen relative to a frame in accordance with example implementations of the present disclosure.

Referring to FIGS. 1 through 5D, an adapter 100 is shown in accordance with example implementations of the present disclosure. The adapter 100 includes an adapter body 102 defining a first channel 104 and a second channel 106. The first channel 104 is disposed between a first body extension 108 and a second body extension 110. The second body extension 110 generally includes a size and shape to fit within a channel or groove of a screen frame into which a mesh screen and spline would traditionally fit. For example, the second body extension 110 can extend from the adapter body 102 for a length of from about 0.20 cm to about 0.75 cm to fit within the channel or groove of the screen frame, however the disclosure is not limited to such dimensions, where the dimensions generally depend on the configuration of the screen frame into which the adapter 100 is to be utilized. FIG. 4 illustrates an example screen frame 50 having a channel 52 into which a mesh screen and spline would traditionally fit. The second body extension 110 fits within the channel 52 to stabilize the adapter 100 relative to the screen frame 50.

The second channel 106 of the adapter body 102 is disposed between a first channel extension 112 and a second channel extension 114. The first channel extension 112 and the second channel extension 114 extend from the first body extension 108 such that the first channel 104 and the second channel 106 have generally offset openings. The second channel 106 generally includes a size and shape to receive a screen support, such as a flexible screen frame support, a rigid screen frame support, or the like. For example, FIGS. 4 and 5D illustrate a screen support 54 received within the second channel 106 and supporting a screen 56 under tension.

The first channel extension 112 and the second channel extension 114 are shown in FIG. 1 projecting inwardly towards the interior of the second channel 106, which can facilitate a pressure fit against the screen support 54, however the adapter 100 is not limited to such configuration. For example, one or more of the first channel extension 112 and the second channel extension 114 may extend from the first body extension 108 at an angle to facilitate the desired shape of the second channel 106, which can depend on the screen support 54 to be received. In an implementation, shown in FIG. 5A, the adapter 100 includes the first channel extension 112 and the second channel extension 114 in a substantially parallel arrangement, extending from the first body extension 108. The second channel extension 114 is shown including a support stop 120 positioned at an end of the second channel extension 114 distal the first body extension 108. The support stop 120 projects outwardly from the second channel extension 114 in a direction toward the first channel extension 112 with a portion 122 sloping inwardly towards the second channel 106 to facilitate introduction of the screen support 54 into the second channel 106 and to secure the screen support 54 against the support stop 120 once positioned within the second channel 106 (described further herein with respect to FIGS. 5C and 5D). Alternatively or additionally, the first channel extension 112 can include the support stop 120 or an additional support stop 120. While the support stop 120 is shown positioned at an end of the second channel extension 114 distal the first body extension 108, the adapter 100 is not limited to such placement. For example, the support stop 120 can be included at an intermediate position of the second channel extension 114 between the first body extension 108 and the distal end to secure the screen support 54 against the support stop 120 at the intermediate position within the second channel 106.

The adapter 100 can be positioned on an interior perimeter of a screen frame or portion thereof to secure the screen support and associated screen relative to the screen frame. For example, FIG. 3 shows an adapter 100 positioned on each interior perimeter of the rectangular screen frame 50 having two lengthwise sections and two width sections. While a continuous adapter 100 is shown for each interior perimeter section, the disclosure is not limited to continuous adapters 100. For example, a plurality of adapters 100 spaced apart from each other can be utilized on one or more interior perimeter sections. In general, the adapter 100 can have a length dependent upon the dimensions of the screen frame 50 to which the adapter 100 is applied. For example, the adapter 100 can have a length from one inch to eighty inches, however the disclosure is not limited to such dimensions. The adapter 100 can also be utilized for non-rectangular screen frames, where the adapter 100 can be cut or formed to fit the respective interior perimeter. While the adapters 100 are shown having squared edges at the corners of the screen frame 50, the adapters 100 are not limited to such edges, where the edges can be cut at an angle dependent on the screen frame 50. For example, the edges of the adapters 100 can be approximately 45 degrees, where two adapter edges meet to fit to an approximately 90 degree corner angle of the screen frame 50.

In implementations, the second body extension 110 can include one or more features to assist with securing the adapter 100 to the channel 52 of the screen frame 50. For instance, the second body extension 110 can define an aperture 116 through at least a portion of the second body extension 110 to permit the second body extension 110 to flex upon application of pressure, which can aid in inserting the second body extension 110 into the channel 52 and/or in retaining the second body extension 110 within the channel 52. As shown in FIG. 2, the aperture 116 can extend along the length of the adapter 100. Alternatively or additionally, a porous material can be utilized to form the second body extension 110 or other portion of the adapter 100.

In implementations, the adapter 100 includes surface features to assist with securing the adapter 100 to the channel 52 of the screen frame 50. For example, the second body extension 110 can include surface ridges 118 or other texturing. In an implementation, the adapter 100 can include pliable surface features to facilitate installation of the adapter 100 into the channel 52 and to resist removal of the second body extension 110 from the channel 52. For example, the adapter 100 shown in FIG. 5A includes fins 124 extending outwardly from the second body extension 110 in a direction away from an end 126 of the second body extension 110. The extension of the fins 124 in a direction away from an end 126 of the second body extension 110 can facilitate installation of the adapter 100 into the channel 52 by bending towards the second body extension 110 while the second body extension 110 is inserted into the channel 52 of the screen frame. The positioning of the fins 124 can also facilitate securing the adapter 100 within the channel 52 by frictionally resisting removal of the second body extension 110 from the channel 52. In implementations, the fins 124 extend from the second body extension at an angle less than 90 degrees. The fins 124 are formed from a substantially pliable material to at least partially bend when interacting with surfaces of the channel 52 during installation and to frictionally interface with the surfaces of the channel 52 to resist removal of the adapter 100 from the channel 52. In implementations, the fins 124 are formed from a material having a hardness value that is less than the hardness value of a material forming another portion of the adapter 100. For example, the fins 124 can be formed from a softer material than the first channel extension 112 and the second channel extension 114 to provide a more rigid second channel 106. In implementations, the fins 124 are formed through coextrusion of a thermoplastic elastomer to form the other portions of the adapter 100, where the thermoplastic elastomer of the fins 124 can have a hardness value less than other portions of the adapter 100 (e.g., the thermoplastic elastomer of the fins 124 can be, but is not limited to, a 65 TPE material and the thermoplastic elastomer of other portions of the adapter can be, but is not limited to, a 90 TPE material). In implementations, an adhesive can be applied to one or more portions of the surfaces defining the first channel 104 or the second channel 106 to assist with securing the adapter 100 relative to the screen frame 50 or the screen support 54.

Figure 5B:
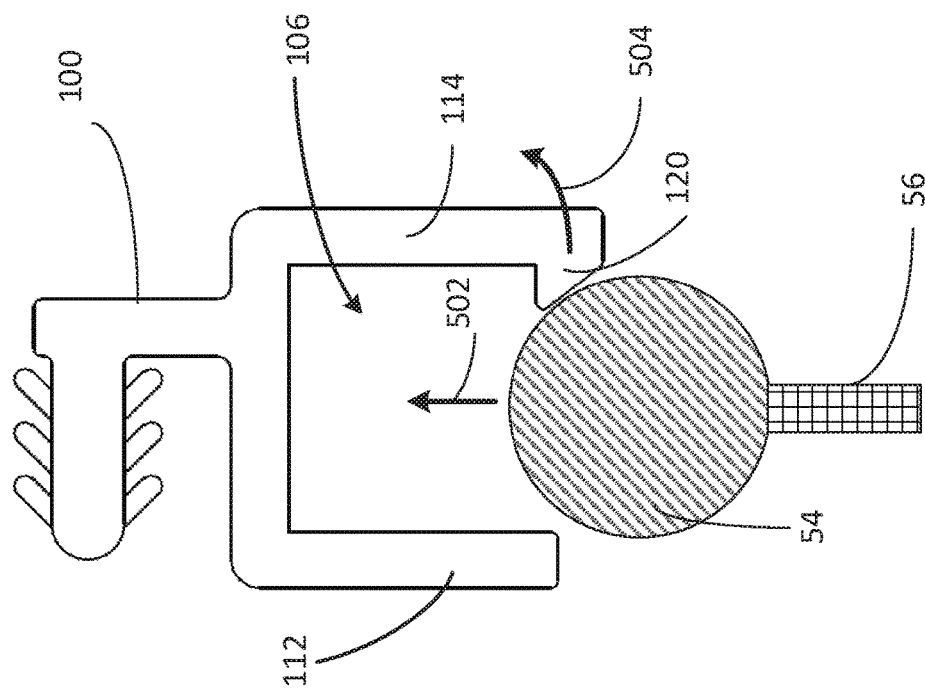
FIG. 5B is a partial cross-sectional view of the screen attachment adapter of FIG. 5A receiving a screen support in a channel of the screen attachment adapter with a screen held under tension by the screen support.
Figure 5A:
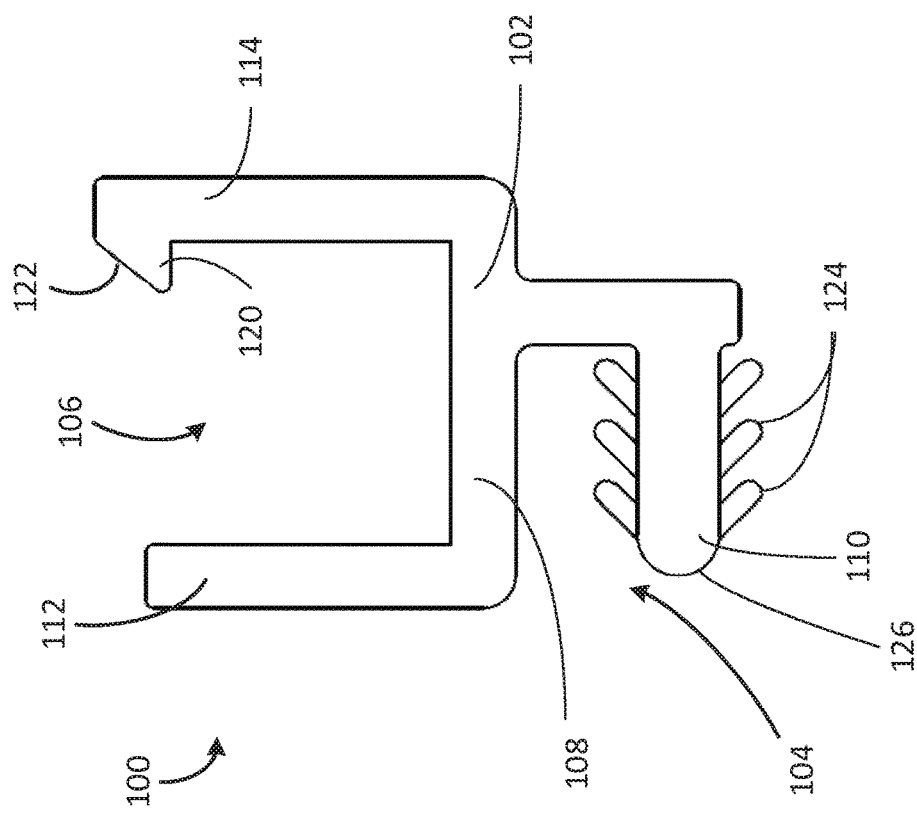
FIG. 5A is an end view of a screen attachment adapter in accordance with example implementations of the present disclosure.
Figure 5D:
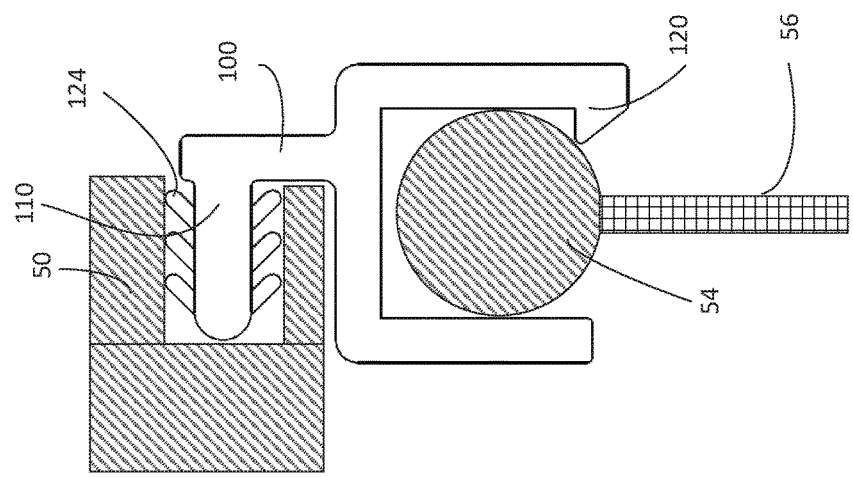
FIG. 5D is partial cross-sectional view of the screen attachment adapter of FIG. 5A installed in the into the groove of the frame with the screen support received in the channel of the screen attachment adapter to hold the screen under tension within the frame.
Figure 5C:
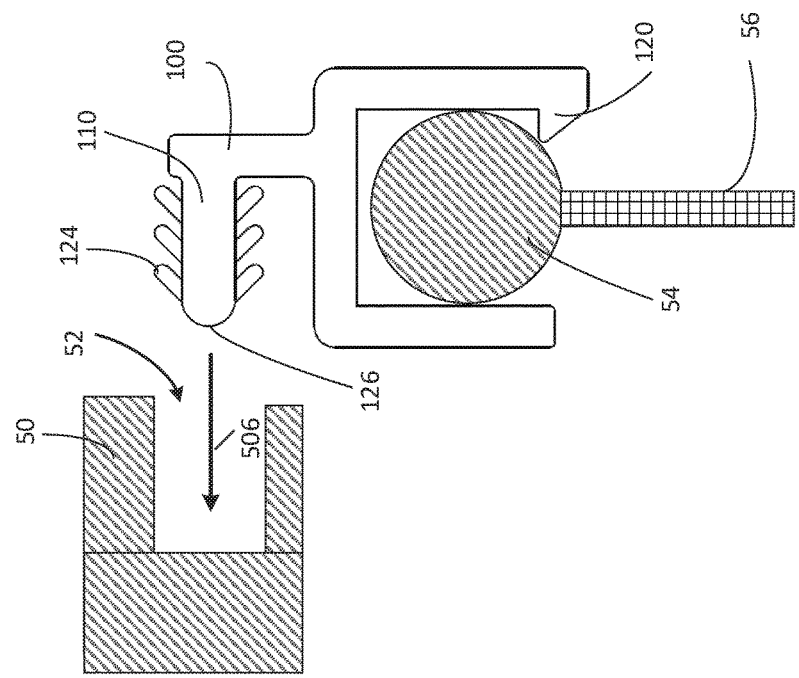
FIG. 5C is a partial cross-sectional view of the screen attachment adapter of FIG. 5A being installed into a groove of a frame.

Referring to FIGS. 5B through 5D, an example installation process of the adapter 100 into a screen support 54 is shown. The screen support 54 supports the screen 56, where the screen support 54 can support the screen 56 under tension by providing a multi-sided frame. Referring to FIG. 5B, the screen support 54 is inserted into the second channel 106 of the adapter 100 (e.g., in a direction indicated at 502). As the screen support 54 contacts the adapter 100, the support stop 120 contacts the screen support 54. As the screen support 54 begins to enter the second channel 106, the support stop 120 is pushed outwardly (e.g., in a direction indicated at 504) due to interaction of the screen support 54 and the portion 122 of the support stop 120, causing bending of at least a portion of the second channel extension 114. Upon insertion of the screen support 54 into the second channel 106, the support stop 120 can return to the initial position where the support stop 120 can secure the screen support 54 within the second channel 106, an example of which is shown in FIGS. 5C and 5D. Referring to FIG. 5C, the adapter 100 can be installed into the channel 52 of the screen frame 50 (e.g., in a direction indicated at 506) while the adapter 100 supports the screen support 54. For example, as the second body extension 110 is introduced to the channel 52, the fins 124 can interact with one or more interior surfaces of the channel 52, which may cause the fins 124 to bend towards the second body extension 110 during installation and while installed. Referring the FIG. 5D, the adapter 100 is shown installed on the screen frame 50 while supporting the screen support 54, holding the screen 56 in place. While installed, the fins 124 can frictionally interface with one or more interior surfaces of the channel 52 to resist removal of the adapter 100 from the channel 52.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A screen attachment adapter, comprising:
   an adapter body, the adapter body defining
      a channel configured to receive a rigid screen support supporting a screen,
      an extension offset from the channel, the extension configured to be inserted into a groove of a frame for an opening to hold the screen relative to the opening when the channel receives the rigid screen support, wherein the extension includes a plurality of fins with at least one fin extending outwardly from at least two sides of the extension, the plurality of fins configured to interact with one or more interior surfaces of the groove when the extension is inserted into the groove, and
      a second channel disposed between the extension and the channel, the second channel having an opening that is offset from the channel.

2. The screen attachment adapter of claim 1, wherein the adapter body includes a first body extension and a second body extension, wherein the second channel is disposed between the first body extension and a second body extension.

3. The screen attachment adapter of claim 2, wherein the adapter body includes a first channel extension and a second channel extension extending from the first body extension to define the channel.

4. The screen attachment adapter of claim 1, wherein at least one fin of the plurality of fins extends outwardly from the extension in a direction away from the opening of the second channel.

5. The screen attachment adapter of claim 1, wherein the adapter body includes a first channel extension and a second channel extension, and wherein the channel is defined between the first channel extension and the second channel extension.

6. The screen attachment adapter of claim 5, wherein the second channel extension includes a support stop projecting outwardly towards the first channel extension.

7. The screen attachment adapter of claim 6, wherein the support stop is positioned at an end of the second channel extension distal the extension.

8. The screen attachment adapter of claim 6, wherein the support stop is configured to support at least a portion of the rigid screen support when the rigid screen support is received within the channel.

9. The screen attachment adapter of claim 1, wherein at least one fin of the plurality of fins is formed from a substantially pliable material to at least partially bend when interacting with the one or more interior surfaces of the groove when the extension is inserted into the groove.

10. A screen attachment adapter, comprising:
an adapter body, the adapter body defining a first channel and a second channel, the first channel configured to receive at least a portion of a frame defining an opening for a screen, the second channel is offset from the first channel and is configured to receive a rigid screen support supporting the screen, the adapter body including
  a first body extension and a second body extension, the first channel defined between the first body extension and the second body extension, the second body extension configured to inserted into a groove of the frame;
  a first channel extension extending from the first body extension; and
  a second channel extension extending from the first body extension and including a plurality of fins with at least one fin extending outwardly from at least two sides of the second channel extension, the plurality of fins configured to interact with one or more interior surfaces of the groove when the second body extension is inserted into the groove, wherein the second channel is defined between the first channel extension and the second channel extension.

11. The screen attachment adapter of claim 10, wherein the second body extension extends outwardly from the adapter body with an end distal to the adapter body.

12. The screen attachment adapter of claim 11, wherein at least one fin of the plurality of fins extends outwardly from the second body extension in a direction away from the end of the second body extension.

13. The screen attachment adapter of claim 10, wherein the first channel extension is substantially parallel to the second channel extension.

14. The screen attachment adapter of claim 10, wherein the second channel extension includes a support stop projecting outwardly towards the first channel extension, the support stop configured to support at least a portion of the rigid screen support when the rigid screen support is received within the second channel.

15. The screen attachment adapter of claim 14, wherein the support stop is positioned at an end of the second channel extension distal the extension.

16. The screen attachment adapter of claim 14, wherein at least one fin of the plurality of fins extends outwardly from the second body extension in a direction away from a distal end of the second body extension.

17. The screen attachment adapter of claim 10, wherein at least one fin of the plurality of fins is formed from a substantially pliable material to at least partially bend when interacting with the one or more interior surfaces of the groove when the second body extension is inserted into the groove.

* * * * *